United States Patent
Yamamoto et al.

(10) Patent No.: US 10,730,182 B2
(45) Date of Patent: Aug. 4, 2020

(54) ACTION INFORMATION LEARNING DEVICE, ROBOT CONTROL SYSTEM AND ACTION INFORMATION LEARNING METHOD

(71) Applicant: FANUC CORPORATION, Minamitsuru-gun, Yamanashi (JP)

(72) Inventors: Tomoyuki Yamamoto, Yamanashi (JP); Yuusuke Kurihara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 255 days.

(21) Appl. No.: 15/935,456

(22) Filed: Mar. 26, 2018

(65) Prior Publication Data

US 2018/0281180 A1 Oct. 4, 2018

(30) Foreign Application Priority Data

Mar. 31, 2017 (JP) .................................. 2017-069866

(51) Int. Cl.
*B25J 9/16* (2006.01)

(52) U.S. Cl.
CPC .............. *B25J 9/163* (2013.01); *B25J 9/1664* (2013.01); *G05B 2219/33056* (2013.01); *G05B 2219/40202* (2013.01); *Y10S 901/03* (2013.01)

(58) Field of Classification Search
CPC ................... B25J 9/163; B25J 9/1664; G05B 2219/33056; G05B 2219/40202; G05B 19/42; Y10S 901/03
(Continued)

(56) References Cited

U.S. PATENT DOCUMENTS

2010/0268382 A1* 10/2010 Ohno ................... G05D 1/0246
  700/245
2014/0316573 A1* 10/2014 Iwatake ................. B25J 9/1697
  700/258
(Continued)

FOREIGN PATENT DOCUMENTS

CN  102402712  4/2012
CN  102819264  12/2012
(Continued)

OTHER PUBLICATIONS

Office Action dated Dec. 4, 2018 in corresponding Japanese Application No. 2017-069866.

*Primary Examiner* — Khoi H Tran
*Assistant Examiner* — B M M Hannan
(74) *Attorney, Agent, or Firm* — Wenderoth, Lind & Ponack, L.L.P.

(57) ABSTRACT

To provide an action information learning device, robot control system and action information learning method for facilitating the performing of cooperative work by an operator with a robot. An action information learning device includes: a state information acquisition unit that acquires a state of a robot; an action information output unit for outputting an action, which is adjustment information for the state; a reward calculation section for acquiring determination information, which is information about a handover time related to handover of a workpiece, and calculating a value of reward in reinforcement learning based on the determination information thus acquired; and a value function update section for updating a value function by way of performing the reinforcement learning based on the value of reward calculated by the reward calculation section, the state and the action.

8 Claims, 6 Drawing Sheets

(58) Field of Classification Search
USPC .............................. 700/245, 250, 253, 257
See application file for complete search history.

(56) References Cited

U.S. PATENT DOCUMENTS

| | | | |
|---|---|---|---|
| 2015/0254380 A1* | 9/2015 | Kimoto ................... | G06F 30/20 |
| | | | 703/13 |
| 2016/0243701 A1* | 8/2016 | Gildert ................... | G05B 19/42 |
| 2017/0028553 A1* | 2/2017 | Tsuda ..................... | B25J 13/084 |
| 2017/0028562 A1* | 2/2017 | Yamazaki ............... | B25J 9/163 |
| 2018/0222046 A1* | 8/2018 | Gotou ..................... | B25J 9/1697 |
| 2019/0184564 A1* | 6/2019 | Muraoka ................. | B23P 19/04 |
| 2020/0030970 A1* | 1/2020 | Mariyama ............... | G05D 3/20 |

FOREIGN PATENT DOCUMENTS

| | | | | |
|---|---|---|---|---|
| CN | 106094813 | 11/2016 | | |
| JP | 2003-84804 | 3/2003 | | |
| JP | 2009-125920 | 6/2009 | | |
| JP | 2017-30137 | 2/2017 | | |
| JP | WO-2018042730 A1 * | 3/2018 | ............ | B25J 9/1687 |

\* cited by examiner ated by the reward calculation unit, the state information
ACTION INFORMATION LEARNING DEVICE, ROBOT CONTROL SYSTEM AND ACTION INFORMATION LEARNING METHOD This application is based on and claims the benefit of priority from Japanese Patent Application No. 2017-069866, filed on 31 Mar. 2017, the content of which is incorporated herein by reference.

BACKGROUND OF THE INVENTION

Field of the Invention

The present invention relates to an action information learning device, robot control system and action information learning method.

Related Art

Conventionally, there have been cases where robots work in a space coexisting with humans. For example, there are cases where robots repeat a series of operations such as carrying a workpiece until a position programmed in advance, handing over the workpiece to an operator, and moving to pick up the next workpiece. In the case of performing cooperative work between a robot and operator in this way, the work has been performed at positions, timings, etc. decided according to the programming. However, in such a case, receiving may be difficult for the operator, or starting the next work may be difficult depending on the handover position and timing. In this regard, a device for optimizing the work to be done by the robot has been disclosed (for example, refer to Patent Document 1).

Patent Document 1: Japanese Unexamined Patent Application, Publication No. 2009-125920

SUMMARY OF THE INVENTION

In order to make a robot perform optimal processing, it is necessary to teach the handover position, etc. by performing programming again; however, there have been limits to locating the optimal position, etc. by trial and error.

The present invention has been made taking account of such problems, and an object thereof is to provide an action information learning device, robot control system and action information learning method for facilitating the performing of cooperative work by an operator with a robot.

An action information learning device (e.g., the action information learning device 300 described later) according to a first aspect of the present invention includes: a state information acquisition unit (e.g., the state information acquisition unit 310 described later) for acquiring state information (e.g., the state s described later) of a robot (e.g., the robot 100 described later), in a case of the robot handing over a workpiece (e.g., the workpiece 7 described later) acquired from a workpiece storage place to an operator (e.g., the operator P described later) within a workpiece handover area (e.g., the handover area 8 described later), which is an area in which to hand over the workpiece; an action information output unit (e.g., the action information output unit 320 described later) for outputting action information (e.g., the action a described later), which is adjustment information for the state information; a reward calculation unit (e.g., the reward calculation section 331 described later) for acquiring determination information, which is information about a handover time (e.g., the handover time T described later) related to handover of the workpiece, and calculating a value of reward in reinforcement learning based on the determination information thus acquired; and a value function update unit (e.g., the value function update unit 332 described later) for updating a value function (e.g., the value function Q described later) by way of performing the reinforcement learning based on the value of reward calculated by the reward calculation unit, the state information and the action information.

According to a second aspect of the present invention, in the action information learning device as described in the first aspect, the state information may include information related to a posture of the robot and handover position within the workpiece handover area, and the adjustment information may include information for performing adjustment of the state information.

According to a third aspect of the present invention, in the action information learning device as described in the second aspect, the state information may further include a movement path of the robot from a position at which acquiring the workpiece to within the workpiece handover area.

According to a fourth aspect of the present invention, in the action information learning device as described in any one of the first to third aspects, the reward calculation unit may establish the value of reward as a positive value in a case of the handover time being shorter than a previous handover time, and establish the value of reward as a negative value in a case of the handover time being longer than a previous handover time.

According to a fifth aspect of the present invention, in the action information learning device as described in any one of the first to fourth aspects, the handover time may consist of a movement time (e.g., the movement time T1 described later) from acquiring the workpiece until moving to a position within the workpiece handover area, and a release time (e.g., the release time T2 described later) until the operator receives the workpiece after moving the workpiece to the position within the workpiece handover area, and the value of reward may be set to a larger value for a case of the release time being shorter, than a case of the movement time being shorter, when the handover time is the same.

According to a sixth aspect of the present invention, in the action information learning device as described in any one of the first to fifth aspects, the value function may be shared with another one of the action information learning device, and the value function update unit may update the value function thus shared.

A robot control system (e.g., the robot control system 1000 described later) according to a seventh aspect of the present invention includes: the action information learning device (e.g., the action information learning device 300 described later) as described in any one of the first to sixth aspects; and a robot control device (e.g., the robot control device 200 described later) that is connected to the action information learning device via a communication network (e.g., the network 400 described later), and controls the robot (e.g., the robot 100 described later), in which the action information learning device includes: an optimized action information output unit (e.g., the optimized action information output unit 350 described later) for generating optimized action information, which is action information for minimizing the handover time by the robot, based on the value function updated by the value function update unit (e.g., the value function update section 332 described later); the optimized action information output unit (e.g., the optimized action information output unit 350 described later) for outputting the optimized action information generated to the robot control device.

An action information learning method according to an eighth aspect of the present invention includes the steps of: acquiring state information of a robot by way of a state information acquisition unit, in a case of the robot handing over a workpiece acquired from a workpiece storage place to an operator, within a workpiece handover area, which is an area in which to hand over the workpiece; outputting action information, which is adjustment information for the state information, by way of an action information output unit; acquiring determination information, which is information regarding a handover time related to handover of a workpiece, and calculating a value of reward in reinforcement learning based on the determination information thus acquired, by way of a reward calculation unit; and updating, by way of a value function update unit, a value function by performing the reinforcement learning based on the value of reward thus calculated, the state information, and the action information.

According to the present invention, it is possible to provide an action information learning device, robot control system and action information learning method for facilitating the performing of cooperative work by an operator with a robot.

DETAILED DESCRIPTION OF THE INVENTION

Embodiment

Figure 1:
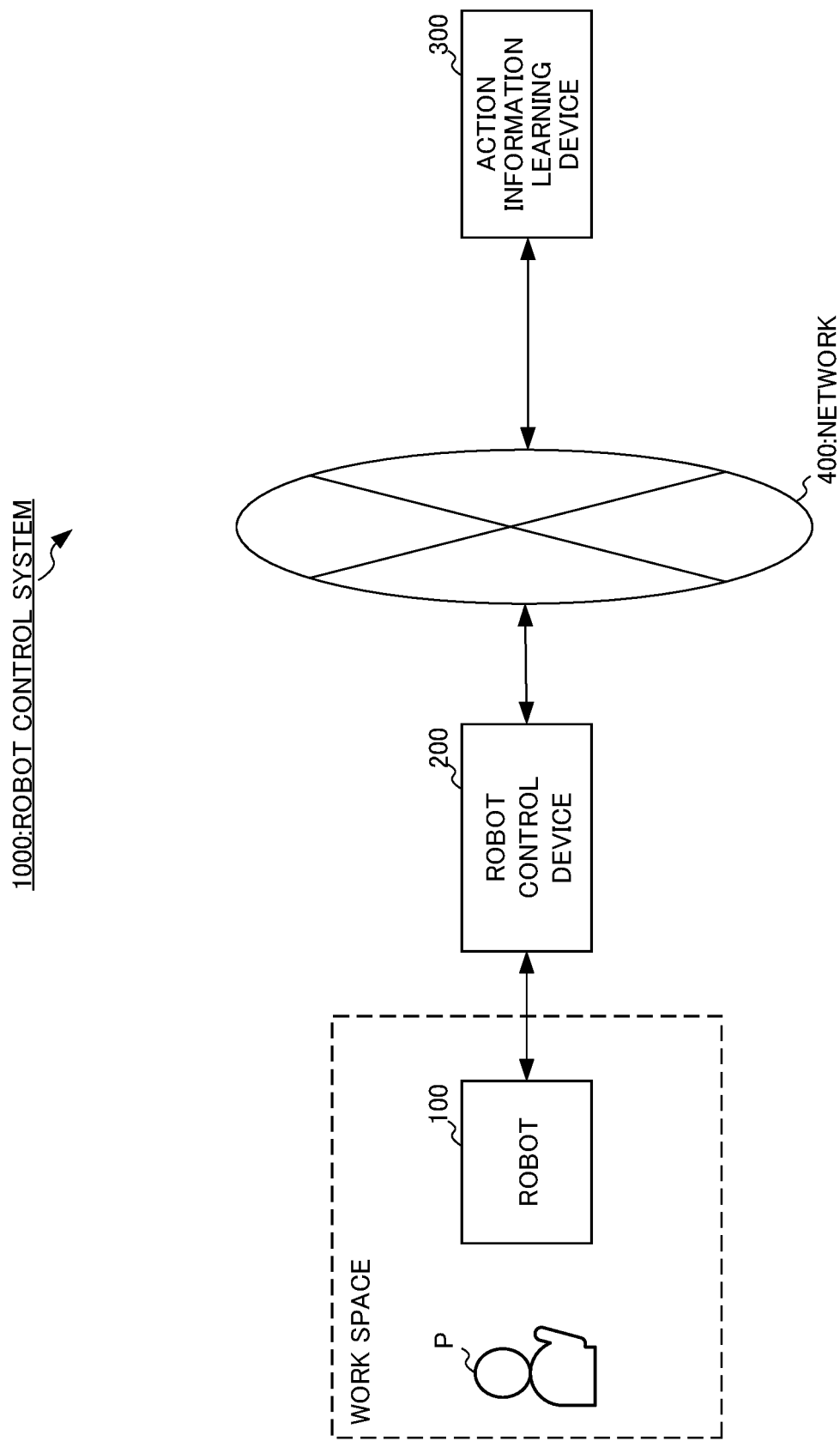
FIG. 1 is a block diagram showing the basic overall configuration of an embodiment of the present invention.

First, an outline of an embodiment of the present invention will be explained. In the present embodiment, a robot 100 and an operator P do work in cooperation within a workspace, as shown in FIG. 1. Then, the robot 100 transports a workpiece 7 (refer to FIG. 3) to the operator P, and the operator P receives the workpiece 7 from the robot 100 and does work. Then, a robot control system 1000 learns the action information of the robot 100 so that the time from the robot 100 transporting the workpiece 7 until the operator P receiving the workpiece 7 becomes the shortest.

Next, the configuration of the robot control system 1000 according to the present embodiment will be explained. The robot control system 1000 includes the robot 100, a robot control device 200, an action information learning device 300 and a network 400. Herein, the robot control devices 200 and robots 100 are communicably connected to make 1-to-1 groups. It should be noted that the robot control devices 200 and robots 100 may be directly connected via a connection interface, and may be connected via a network such as a LAN (Local Area Network).

In addition, the robot control device 200 and the action information learning device 300 are each directly connected via a connection interface, or are each connected via the network 400 to be able to perform mutual communication. It should be noted that the network 400, for example, is a LAN constructed within the factory, the Internet, public telephone network, or a combination of these. The specific communication system of the network 400, whether being a wired connection or wireless connection, etc. is not particularly limited.

Figure 2:
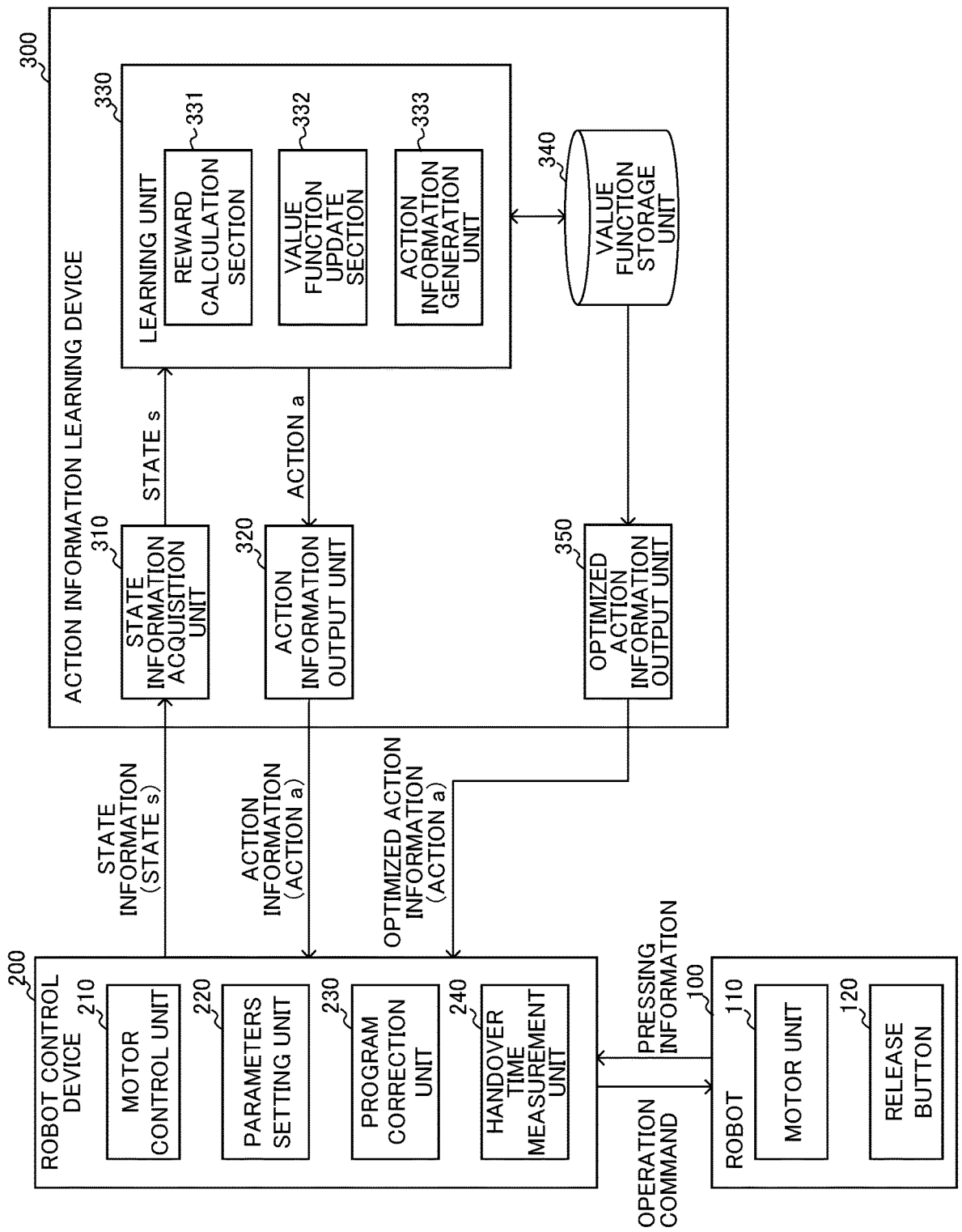
FIG. 2 is a block diagram showing functional blocks equipped to each device included in the embodiment of the present invention.

Next, the functions of these devices included in the robot control system 1000 will be explained by referencing FIG. 2. Herein, FIG. 2 is a block diagram showing functional blocks included in each device. It should be noted that the network 400 existing between each device is omitted from this illustration.

The robot 100 transports the workpiece 7 such as a component, for example, in accordance with an operation command generated based on a robot control program set in the robot control device 200 and the setting values of parameters set in the robot control device 200. The robot 100 includes a motor unit 110 and a release button 120. The motor unit 110 is a servomotor that causes a drive shaft of a hand unit 13 (described later) or the like of the robot to drive. The release button 120 is a button for performing processing to detach the workpiece 7 gripped in the hand unit 13. The release button 120 is operated by the operator P. Pressing information by operating the release button 120 is sent to the robot control device 200.

Figure 3:
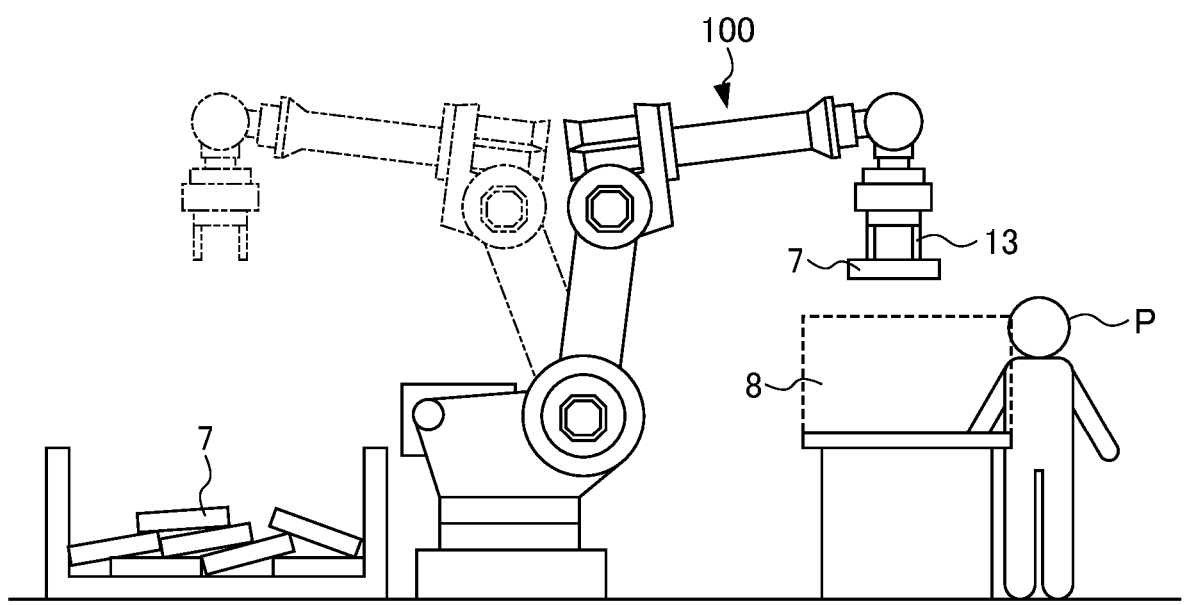
FIG. 3 is a view for explaining operations of a robot in the embodiment of the present invention.

Herein, operations by the robot 100 will be explained based on FIG. 3. FIG. 3 is a view for explaining operations of the robot 100 in the embodiment of the present invention. The robot 100 is a 6-axis articulated robot, for example. The drive shaft of each joint part of the robot 100 and the drive shaft of the hand unit 13 drive according to the motor unit 110, and is controlled by the robot control device 200. The robot 100 acquires the workpiece 7 placed at a workpiece storage place, and transports the workpiece 7 to a predetermined position in a handover area 8 on a workbench. The time from this robot 100 acquiring the workpiece 7 until transporting the workpiece 7 to the predetermined position of the handover area 8 is defined as the movement time T1.

The robot 100 changes the position and posture according to the manipulation done by the operator P on the robot 100, e.g., operation to grasp and move the vicinity of the hand unit 13 of the robot 100 by the operator P. In addition, the motor control unit 210 of the robot control device 200 performs control to detach the workpiece 7 from the hand unit 13 according to the pressing operation on the release button 120 by the operator P, and the operator P receives the workpiece 7 from the robot 100. The time from this robot 100 transporting the workpiece 7 to the predetermined position in the handover area 8 until the operator P receiving the workpiece 7 is defined as release time T2. Then, the time arrived at by adding the movement time T1 and release time T2 is defined as handover time T.

Although functional blocks of the robot 100 have been explained above, the aforementioned functional blocks are portions particularly relevant to operations in the present embodiment. The robot 100 includes general functional blocks such as a motor drive amplifier for amplifying the operation command, and a control panel for receiving manipulations of the user, for example, in addition to the aforementioned functional blocks. However, since these general functional blocks are well known to those skilled in the art, detailed explanation and illustration thereof will be omitted.

Referring back to FIG. 2, the robot control device 200 is a device causing the predetermined operations to be performed by the robot 100, by controlling the robot 100. In addition, the robot control device 200 sends state information (also referred to as "status") to the action information learning device 300. Furthermore, the robot control device 200 receives action information (also referred to as "action") from the action information learning device 300. The details of the respective information will be explained together with the explanation of functional blocks of the action information learning device 300.

The robot control device 200 includes the motor control unit 210, parameter setting unit 220, program correction unit 230, and handover time measurement unit 240.

The motor control unit 210 generates operation commands based on the robot control program and the setting values of parameters (for example, values related to the posture within handover area 8 of robot 100 including hand unit 13, position within the handover area 8, movement path of robot 100 from acquiring workpiece 7 until reaching position within handover area 8), and sends the generated operation commands to the robot 100. Then, the motor control unit 210 controls the driving of the motor unit 110, etc. of the robot 100 by sending the operation command to the robot 100. The transport operation of the workpiece 7 by the robot 100 is realized by way of this processing. Herein, terms and conditions for transport (for example, map information for avoiding obstructions, movement speed, etc.) are defined in the robot control program.

The parameter setting unit 220 is a portion that sets parameters related to movement processing during transport of the workpiece 7 according to this robot control program of the robot 100. Parameters of the robot 100, for example, are parameters related to the posture within the handover area 8 of the robot 100 including the hand unit 13, position within the handover area 8, and movement path of the robot 100. The parameters indicating the posture of the robot 100 including the hand unit 13, for example, is data related to the angle of the hand unit 13. In addition, the parameters indicating the position within the handover area 8 is data expressing the position of the hand unit 13 in XYZ coordinates, for example. The parameters related to the movement path of the robot 100, for example, is data of teaching points of the robot 100 from a position in the workpiece storage place at which the robot 100 acquires the workpiece 7 until the handover area 8. Herein, teaching points of the robot 100 refer to the positions of the leading end part of the hand unit 13 of the robot 100. The setting values of these parameters are adjusted based on the action information outputted from the action information learning device 300, and optimized action information.

The program correction unit 230 directly corrects the robot control program. More specifically, the program correction unit 230 directly corrects program code based on the action information outputted from the action information learning device 300 such as the posture within the handover area 8 of the robot 100 including the hand unit 13 and position within the handover area 8, which are described by this robot control program, and/or the optimized action information.

The handover time measurement unit 240 is a control unit that measures time. The handover time measurement unit 240 measures a movement time T1, which is the time until for the robot 100 acquiring a workpiece 7 placed in the workpiece storage place until transporting the workpiece 7 to a predetermined position in the handover area 8. In addition, the handover time measurement unit 240 measures a release time T2, which is the time from transporting the workpiece 7 to the predetermined position in the handover area 8 until the operator P receives the workpiece 7.

The action information learning device 300 is a device that performs reinforcement learning. Prior to an explanation of the respective functional blocks included in the action information learning device 300, the basic workings of reinforcement learning will be explained first. An agent (corresponding to the action information learning device 300 of the present embodiment) monitors the state of the environment, selects a certain action, and the environment changes based on this action. In accordance with the change in environment, some kind of reward is given, and the agent learns selection of a better action (decision-making). Supervised learning indicates a completely correct solution; whereas, the reward in reinforcement learning is often a fragmentary value based on a partial change in environment. For this reason, the agent learns so as to select an action such that maximizes the total of reward over the future.

By learning actions with reinforcement learning in this way, it learns a method for learning the appropriate action based on the interaction imparted on the environment by the action, i.e. learning for maximizing the reward obtained in the future. In the present embodiment, this represents the matter of being able to acquire an action such that has an effect on the future, like selecting action information for shortening the handover time T, and further shortening the release time T2, for example.

Herein, although it is possible to use any learning method as the reinforcement method, in the following explanation, an explanation is made with an example of a case of using Q-learning, which is a method of learning a quality Q(s,a) of selecting an action a, under a certain state s of the environment. Q learning has the purpose of selecting an action a having the highest quality Q(s,a) from among the available actions a as the optimal action, when a certain state s.

However, at the moment of initially starting Q learning, the correct value of the quality Q(s,a) is completely unknown for combinations of state a and actions a. Therefore, the agent selects various actions a under a certain state s, and learns the correct quality Q(s,a) by making the selection of a better action based on the reward granted relative to the action a at this time.

In addition, since it is desired to maximize the total of rewards obtained in the future, it aims to configure so as to ultimately become the quality $Q(s,a)=E[\Sigma(\gamma^t)r_t]$. Herein, [ ] represent the expected value, t is the time, γ is a parameter called discount rate described later, $r_t$ is the reward at time t, and Σ is the total according to time t. The expected value in this formula is the expected value in the case of the state changing according to the optimal action. However, since it is unclear what the optimal action is in the course of Q-learning, reinforcement learning is done while searching by performing various actions. An update method of such a quality Q(s,a) can be represented by the following Formula (1), for example.

[Math. 1]

$$Q(s_{t+1}, a_{t+1}) \leftarrow Q(s_t, a_t) + \alpha\left(r_{t+1} + \gamma\max_{a}Q(s_{t+1}, a) - Q(s_t, a_t)\right) \quad (1)$$

In the above Formula (1), $s_t$ represents the state of the environment at time t, and $a_t$ represents the action at time t. The state changes to $s_{t+1}$ according to action $a_t$. $r_{t+1}$ represents the reward obtained by this change in state. In addition, a term with max becomes a value arrived at by multiplying γ by the Q value in the case of selecting the action a having the highest Q value known at this time under the state $s_{t+1}$. Herein, γ is a parameter of 0<γ≤1, and is called discount rate. In addition, α is a learning rate, and defined in the range of 0<α≤1.

The aforementioned Formula (1) expresses a method of updating the quality $Q(s_t,a_t)$ of a action at in the state $s_t$, based on the returned reward $r_{t+1}$ as a result of a trial run $a_t$. This update type shows the matter of the quality $Q(s_t,a_t)$ increasing if the quality $\max_a Q(s_{t+1},a)$ of the best action in the subsequent state st+1 from action at is greater than the quality $Q(s_t,a_t)$ of the action in state $s_t$, and shows the quality $Q(s_t,a_t)$ decreasing if conversely smaller. In other words, the quality Q of a certain action in a certain state is made to approach the value of the best action in the subsequent state depending on this. However, this difference changes depending on the ideal states for the discount rate γ and reward $r_{t+1}$; however, basically, it becomes a mechanisms in which the quality for the best action in a certain state propagates to the quality of the action one previous state leading to this.

Herein, with Q-learning, there is a method of performing learning by creating a table of Q(s,a) for all state action pairs (s,a). However, there are cases where the number of state is too great to obtain the values of Q(s,a) for all state action pairs, and Q-learning converges but requires much time.

Therefore, it may be configured to use the known technology called DQN (Deep Q-Network). More specifically, by constituting a value function Q using an appropriate neural network, and adjusting parameters of the neural network, it may be configured so as to calculate the value of the quality Q(s,a) by approximating the value function Q by the appropriate neural network. By using DQN, it becomes possible to shorten the time required in order for Q-learning to converge. It should be noted that there is a detailed description of DQN in the following Non-Patent Document.

Non-Patent Document

"Human-level control through deep reinforcement learning," Volodymyr Mnih[1] (online), (searched Mar. 17, 2017 (year/month/day)), Internet <URL: http://files.davidqiu.com/research/nature14236.pdf>

The action information learning device 300 performs Q-learning for which an explanation was made above. More specifically, the action information learning device 300 learns the value function Q to select, with the contents of the robot control program and the parameters at the time of execution of this robot control program set in the robot 100 established as state s, and with the correction of this robot control program and the adjustment of parameters related to this state s established as action a.

The action information learning device 300 observes the state s of the robot control program, parameters, etc. set in the robot 100, and determines the action a. The action information learning device 300 is returned a reward every time doing an action a. The action information learning device 300 searches for the optimal action a in a trial and error manner so that the total of rewards in the future becomes a maximum. By configuring in this way, the action information learning device 300 makes it possible to select the optimal action a relative to the state s, which is contents of the robot control program, a combination of parameters during execution of this robot control program, etc. set in the robot 100.

In other words, based on the value function Q learned by the action information learning device 300, by selecting the action a such that the value of the value function Q becomes the maximum, among the actions a applied to the contents of the robot control program and combination of parameters during execution of this robot control program, related to a certain state s, it becomes possible to select an action a such that the handover time T and release time T2, which are times related to handover of the workpiece 7, become the shortest while.

In order to perform the above reinforcement learning, the action information learning device 300 includes a state information acquisition unit 310, action information output unit 320, learning unit 330 and value function storage unit 340.

The state information acquisition unit 310 is a portion that acquires state information (state s), which is the contents of a robot control program, combination of parameters during execution of this robot control program, etc., from the robot control device 200 (and/or robot 100). This state s corresponds to the environment state s in Q-learning.

More specifically, in the state s of the present embodiment, the contents of the robot control program for controlling the robot 100, and the combination of parameters during execution of this robot control program are included. In the parameters, information related to the posture within the handover area 8 of the robot 100 including the hand unit 13, position within the handover area 8, and the movement path from acquiring the workpiece 7 until arriving at a position within the handover area 8 by way of this robot control program, etc. is included. The state information acquisition unit 310 outputs the acquired state s to the learning unit 330.

In addition, the state information acquisition unit 310 also acquires determination information for calculating a reward for performing Q-learning. More specifically, the handover time T after execution according to the robot control program related to s and parameters during execution of this robot control program is set as determination information for calculating the reward for performing Q-learning. The handover time T consists of the movement time T1, which is the time for the robot 100 to acquire the workpiece 7 and then move up to a position within the handover area 8, and the release time T2 from moving to a position within the handover area 8 until the workpiece 7 is transferred to the operator P, as mentioned above.

The action information output unit 320 is a portion that sends the action information (action a) generated by the learning unit 330 to the robot control device 200. The robot control device 200, by correcting the current state s, i.e. the robot control program and parameters currently set, based on this action a, transitions to the next state s' (i.e. corrected robot control program, corrected parameters, and state for a case of executing movement processing according to this corrected robot control program and corrected parameters).

The learning unit 330 is a portion that learns the quality Q (s,a) for a case of selecting a certain action a under a certain state s of the environment. More specifically, the learning unit 330 includes a reward calculation unit 331, value function update unit 332 and action information generation unit 333.

The reward calculation unit 331 is a portion that calculates a reward for case of selecting the action a, based on the determination information. Herein, in the present embodiment, the value of reward shall be a negative value in the case of the handover time T of the robot 100 operating based on the corrected robot control program related to the state s' corrected according to the action a, and the corrected parameters during execution of this corrected robot control program becoming longer than the handover time T of the robot 100 operated based on the robot control program prior to correction related to the state s prior to being corrected according to the action a and the parameters prior to correction during execution of this robot control program prior to correction.

On the other hand, the value of reward shall be a positive value in the case of the handover time T of the robot 100 operating based on the corrected robot control program related to the state s' corrected according to the action a, and the corrected parameters during execution of this corrected robot control program becoming shorter than the handover time T of the robot 100 operated based on the robot control program prior to correction related to the state s prior to being corrected according to the action a and the parameters prior to correction during execution of this robot control program prior to correction.

In addition, it is possible to configure so as to give weighting for the value of reward. For example, for the movement time T1 and the release time T2, it is preferable to make the positive value of reward larger for the case of the release time T2 becoming shorter than the case of the movement time T1 becoming shorter. In other words, it is good to configure so that the positive value becomes larger according to the extent by which the release time T2 shortened. It should be noted that the above-mentioned calculation method of the value of reward is an example and is not to be limited thereto. For example, it may be configured so as to arbitrarily create in advance a reward association table (provisional name) that associates the value of reward with the variation in the handover time T, variation in movement time T1, and variation in release time T2 between the state s' and state S, and calculate the value of reward based on the reward association table. In addition, it may be configured so as to arbitrarily create in advance a reward function (provisional name) establishing the variation in handover time T, variation in movement time T1 and variation in release time T2 as inputs, and calculate the value of reward based on the reward function.

The value function update section 332 updates the value function Q stored by the value function storage section 340, by performing Q-learning based on the state s, action a, state s' in case of applying action a to state s, and value of reward calculated in the above-mentioned way.

The update of the value function Q may be performed by on-line learning, may be performed by batch learning, or may be performed by mini-batch learning. On-line learning is a learning method of performing updating of the value function Q instantaneously, whenever the state s transitions to a new state s', by applying a certain action a to the current state s. In addition, batch learning is a learning method of collecting data for learning by repeating the applying of a certain action a to the current state s, and the state s transitioning to a new state s', and then performing updating of the value function Q using all of the collected data for learning. Furthermore, mini-batch learning is a learning method between on-line learning and batch learning of performing updating of the value function Q each time a certain amount of data for learning accumulates.

The action information generation unit 333 generates an action a in order to cause various operations (corresponding to action a in Q-learning) to be performed by the robot 100 in the course of Q-learning, and outputs the generated action a to the action information output unit 320.

More specifically, the action information generation unit 333 selects an action a in the course of Q-learning relative to the current state s. Correction information related to the contents coded by the robot control program related to the current state s, and the setting values of parameters related to the current state s (for example, values related to posture of robot 100 including the hand unit 13, position within the handover area 8, and movement path of robot 100 from acquiring the workpiece 7 until reaching the position within the handover area 8) are included in the action a of the present embodiment.

For example, in the case of applying setting values of parameters included in the action a to the robot control program and the parameters (for example, values r values related to posture of robot 100 including the hand unit 13, position within the handover area 8, and movement path of robot 100 from acquiring the workpiece 7 until reaching a position within the handover area 8) included in state s, then transitioning to the state s', and a plus reward (reward of positive value) being returned, the action information generation unit 333 may configure so as to adopt a plan that selects, as the next action a', an action a' such that the handover time T further shortens, by slightly moving the position within the handover area 8 to a side of the release position, which is the position at which detaching the workpiece 7, or slightly changing the posture of the robot 100 in the direction of the release posture, which is the posture in which detaching the workpiece 7.

In addition, it may conversely be configured so that the action information generation unit 333 selects an action a' so as to be closer to the state s than state s' in the case of a minus reward (reward of negative value) being returned. Alternatively, it may be configured so as to collect actions believed to be a minus reward, by selecting an action a' such that approaches the state s'. Furthermore, the action information generation section 333 may configure so as to adopt a plan that selects the action a' by a well-known method such as a greedy method of selecting the action a' having the highest quality Q(s,a) among the qualities of existing actions a estimated, or an c-greedy method of randomly selecting the action a' with a small probability c, and selecting the action a' having the highest quality Q(s,a) other than this.

The value function storage unit 340 is a storage device that stores the value functions Q. The value functions Q stored in the value function storage unit 340 are updated by the value function update section 332.

In addition, the action information learning device 300 generates an action a (hereinafter referred to as "optimized action information") for causing an operation for which the quality Q(s,a) reaches a maximum to be performed in the robot 100, based on the value function Q updated by the value function update section 332 performing Q-learning.

The action information learning device 300 includes an optimized action information output unit 350. The optimized action information output unit 350 acquires the value function Q stored by the value function storage unit 340. This value function Q is a function updated by the value function update section 332 performing Q-learning as mentioned above. Then, the optimized action information output unit 350 generates the optimized action information based on the value function Q, and outputs the optimized action information thus generated to the robot control device 200. In this optimized action information, the corrected robot control program and corrected parameters during execution of this corrected robot control program are included, similarly to the action information outputted by the action information output unit 320 in the course of Q-learning.

By the robot control device 200 correcting the robot control program and parameters currently set based on this optimized action information and generating an operation command, the robot 100 can operate so that the handover time T and release time T2 become the shortest.

The functional blocks included in the robot control device 200 and action information learning device 300 have been explained above. In order to realize these functional blocks, the robot control device 200 and action information learning device 300 include an arithmetic processing unit such as a CPU (Central Processing Unit). In addition, the robot control device 200 and action information learning device 300 also include an auxiliary storage device such as a HDD (Hard Disk Drive) storing various control programs such as application software and the OS (Operating System), and a main storage device such as RAM (Random Access Memory) for storing data that is necessitated temporarily upon the arithmetic processing unit executing programs.

Then, in the robot control device 200 and action information learning device 300, the arithmetic processing unit reads out the application software and/or OS from the auxiliary storage device, and performs arithmetic processing based on this application software and/or OS, while expanding the read application software and/or OS in the main storage device. In addition, based on these computation results, the robot control device 200 and action information learning device 300 control the various hardware possessed by the respective devices. The functional blocks of the present embodiment are thereby realized. In other words, the present embodiment can be realized by hardware and software cooperating.

As a specific example, the robot control device 200 can be realized by combining application software for realizing the present embodiment with a general control device for the robot 100. In addition, the action information learning device 300 can be realized by combining application software for realizing the present embodiment with a general personal computer.

However, since the computation amount increases accompanying machine learning for the action information learning device 300, it is good to make so that high-speed processing is possible when configuring to install GPUs (Graphics Processing Units) to a personal computer, and using the GPUs in the arithmetic processing accompanying machine learning, according to a technique called GPGPU (General-Purpose computing on Graphics Processing Units). Furthermore, in order to perform higher-speed processing, the action information learning device 300 may be configured to construct a computer cluster using a plurality of computers equipped with such GPUs, and perform parallel processing with the plurality of computers included in this computer cluster.

Figure 4:
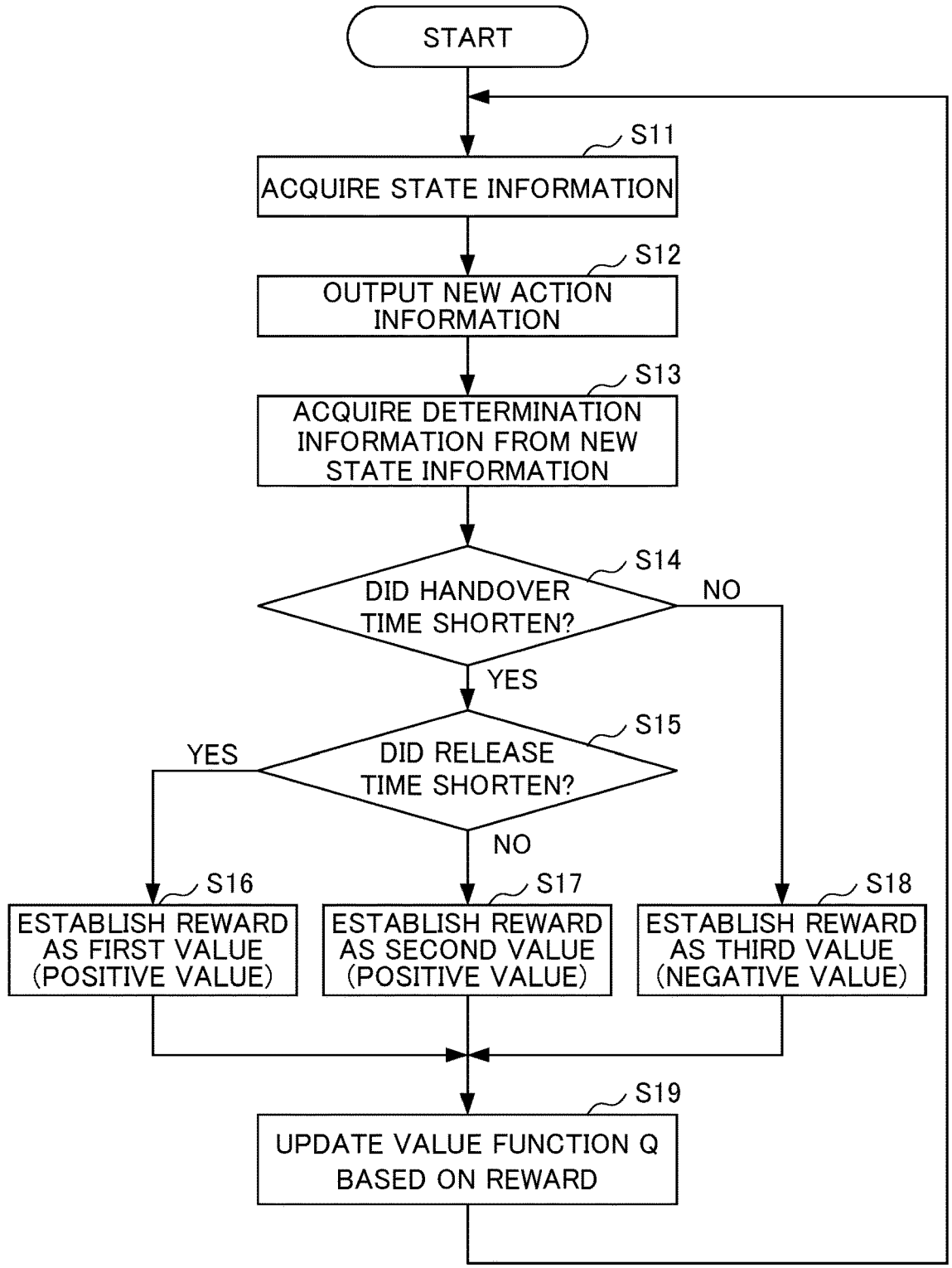
FIG. 4 is a flowchart showing the basic operations during reinforcement learning in the embodiment of the present invention.

Next, an explanation will be made for the operations of the action information learning device 300 that performs Q-learning as action information learning processing in the present embodiment, by referencing the flowchart of FIG. 4.

First, in Step S11 (hereinafter simply referred to as "S"), the state information acquisition unit 310 acquires state information from the robot control device 200. The acquired state information is outputted to the value function update section 332 and/or action information generation section 333. As mentioned above, this state information is information corresponding to the state s of the environment in Q-learning, and the contents of the robot control program and information related to the posture within the handover area 8 of the robot 100 including the hand unit 13, position within the handover area 8 and movement path, which are setting values of parameters at the moment of S11, are included therein. It should be noted that the robot control program and setting values of parameters at the moment of first starting Q-learning shall be generated by the user in advance. In other words, in the present embodiment, the robot control program and initial setting values of parameters generated by the user are adjusted to optimal by way of reinforcement learning.

In S12, the action information generation section 333 generates new action information, and outputs the new action information (action a) thus generated to the robot control device 200 via the action information output unit 320. The robot control device 200 having received the action information drives the robot 100 to perform handover processing of the workpiece 7 according to the state s' established by correcting the robot control program and parameters related to the current state s, based on the received action information. As mentioned above, this action information corresponds to the action a in Q-learning. Herein, the point of the action information including the corrected values of a robot control program and setting values of parameters, for example, is as mentioned above.

In S13, the state information acquisition unit 310 acquires the determination information for the new state s'. Herein, the robot control program and parameters related to state s' are included in the new state s'. In addition, the determination information includes the handover time T consisting of the movement time T1 required in order to perform movement processing and the release time T2 related to state s'. The acquired state information is outputted to the reward calculation section 331.

The reward calculation section 331 calculates the reward based on the inputted determination information. For this reason, in S14, the reward calculation section 331 determines whether the handover time T included in the determination information has shortened. Such a determination can be performed by comparing between the handover time T required in order to perform movement processing related to state s' included in the determination information of state s', and the handover time T required in order to perform movement processing related to state s included in the determination information of state s, which is the state prior to state s'. If the handover time T became shorter (S14: YES), the reward calculation section 331 advances the processing to S15. Otherwise, if the handover time T became longer (S14: NO), the reward calculation section 331 advances the processing to S18.

In S15, the reward calculation section 331 determines whether the release time T2 included in the determination information became shorter than release time T2 required in order to perform the movement processing related to state s included in the determination information of state s, which is the state prior to state s'. If the release time T2 became shorter (S15: YES), the reward calculation section 331 advances the processing to S16. On the other hand, if the release time T2 became longer (S15: NO), the reward calculation section advances the processing to S17.

In S16, the reward calculation section 331 sets the reward as a first value. Herein, the first value shall be a positive value. Subsequently, the learning unit 330 advances the processing to S19. In S17, the reward calculation section 331 sets the reward as a second value. Herein, the second value shall be a positive value. In addition, the second value shall be a value smaller than the first value. Subsequently, the learning unit 330 advances the processing to S19. In S18, the reward calculation section 331 sets the reward as a third value. Herein, the third value shall be a negative value. It should be noted that it may be configured so as to further perform weighting of the first value, second value and third value, according to the size of the difference in time compared with the previous time.

In S19, the value function update section 332 updates the value function Q stored by the value function storage unit 340, based on the value of the reward calculated in the above way. Then, the learning unit 330 returns to S11 again, and by repeating the aforementioned processing, the value function Q converges to an appropriate value. It should be noted that the learning unit 330 may be configured so as to end the aforementioned processing on the condition of having repeated a predetermined number or times, or having repeated for a predetermined time. Although the operations of the action information learning device 300 have been explained above, the processing of calculating the value of reward from S14 to S18 is one example, and is not limited thereto. For example, as mentioned above, it may be configured so as to calculate the value of reward by inputting the variation in the handover time T, variation in movement time T1, and variation in release time T2 between the state s' and state s into a reward association table (provisional name) or reward function (provisional name) set in advance.

According to the operations explained above by referencing FIG. 4, the present embodiment exerts an effect in being able to generate a value function Q for generating action information for shortening the handover time T and release time T2.

Next, an explanation will be made for operations during generation of optimized action information by way of the action information learning device 300, by referencing the flowchart of FIG. 5. First, in S21, the optimized action information output unit 350 of the action information learning device 300 acquires a value function Q stored by the value function storage unit 340. This value function Q was updated by the value function update section 332 performing Q-learning in the aforementioned way.

In S22, the optimized action information output unit 350 generates optimized action information by selecting, as the optimal action, the action a having the highest quality Q(s,a) from among the available actions a for the state s currently set, for example, based on this value function Q, and outputs the generated optimized action information to the robot control device 200.

According to the above, the robot control device 200 corrects the state s currently set (i.e. robot control program and parameters currently set) based on this optimized action information to generate an operation command. Then, by sending the generated operation command to the robot 100, the robot control device 200 exerts an effect in that the robot 100 can operate so that the handover time T becomes the shortest.

Figure 5:
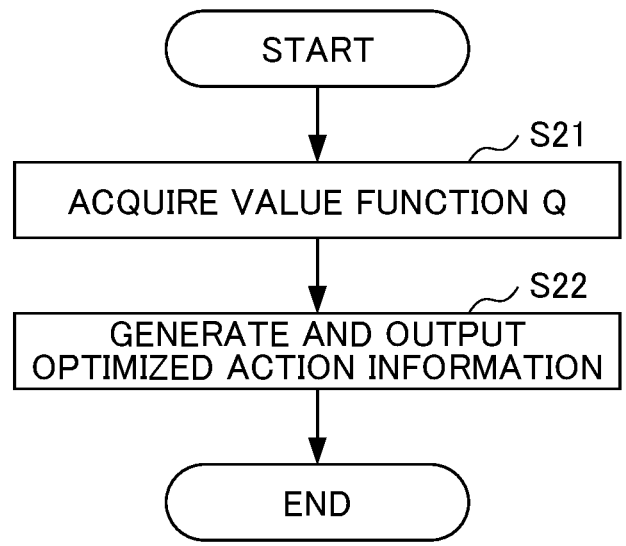
FIG. 5 is a flowchart showing the basic operations during selection of optimized action information in the embodiment of the present invention.

In addition, in the present embodiment, by way of the operations explained by referencing FIG. 5, the action information learning device 300 generates optimized action information based on the value function Q, then the robot control device 200 corrects the robot control program and parameters currently set based on this optimized action information, and generates an operation command. Then, the robot control device 200 also exerts an effect in that it becomes possible to control the robot 100 by shortening the handover time T by way of sending the generated operation command to the robot 100.

In the present embodiment, it is possible to shorten the handover time T by way of performing reinforcement learning while adjusting the robot control program and/or the setting values of parameters in the aforementioned way. In other words, the present embodiment exerts advantageous effects compared to the conventional technology.

It should be noted that each of the respective devices included in the above-mentioned robot control system 1000 can be realized by way of hardware, software or a combination of these. In addition, the action information learning method performed by way of cooperation between each of the respective devices included in the above-mentioned robot control system 1000 can also be realized by way of hardware, software or a combination of these. Herein, being realized by software indicates the matter of being realized by a computer reading out and executing programs.

The programs can be stored using various types of non-transitory computer readable media, and supplied to a computer. The non-transitory computer readable media includes tangible storage media. Examples of non-transitory computer readable media include magnetic media (for example, flexible disks, magnetic tape, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)). In addition, the programs may be supplied to a computer by way of various types of transitory computer readable media. Examples of transitory computer readable media include electrical signals, optical signals and electromagnetic waves. The transitory computer readable media can supply programs to a computer via wired communication paths such as electrical wires and optical fiber, or a wireless communication path.

In addition, the aforementioned embodiment is a preferred embodiment of the present invention; however, it is not to limit the scope of the present invention to only the above-mentioned embodiment, and implementation is possible in modes achieved by conducting various modifications in a scope not departing from the gist of the present invention.

In the aforementioned embodiment, it is assumed to realize the action information learning device 300 by way of a separate device from the robot 100 and robot control device 200; however, it may be configured so as to realize a part or the entirety of the functions of the action information learning device 300 by way of the robot control device 200, for example.

In the aforementioned embodiment, the action information learning device 300 is established as a device having a function of learning and a function of generating action information; however, it may be configured so as to perform the function of performing learning and the function of generating action information by way of a separate device.

Figure 6:
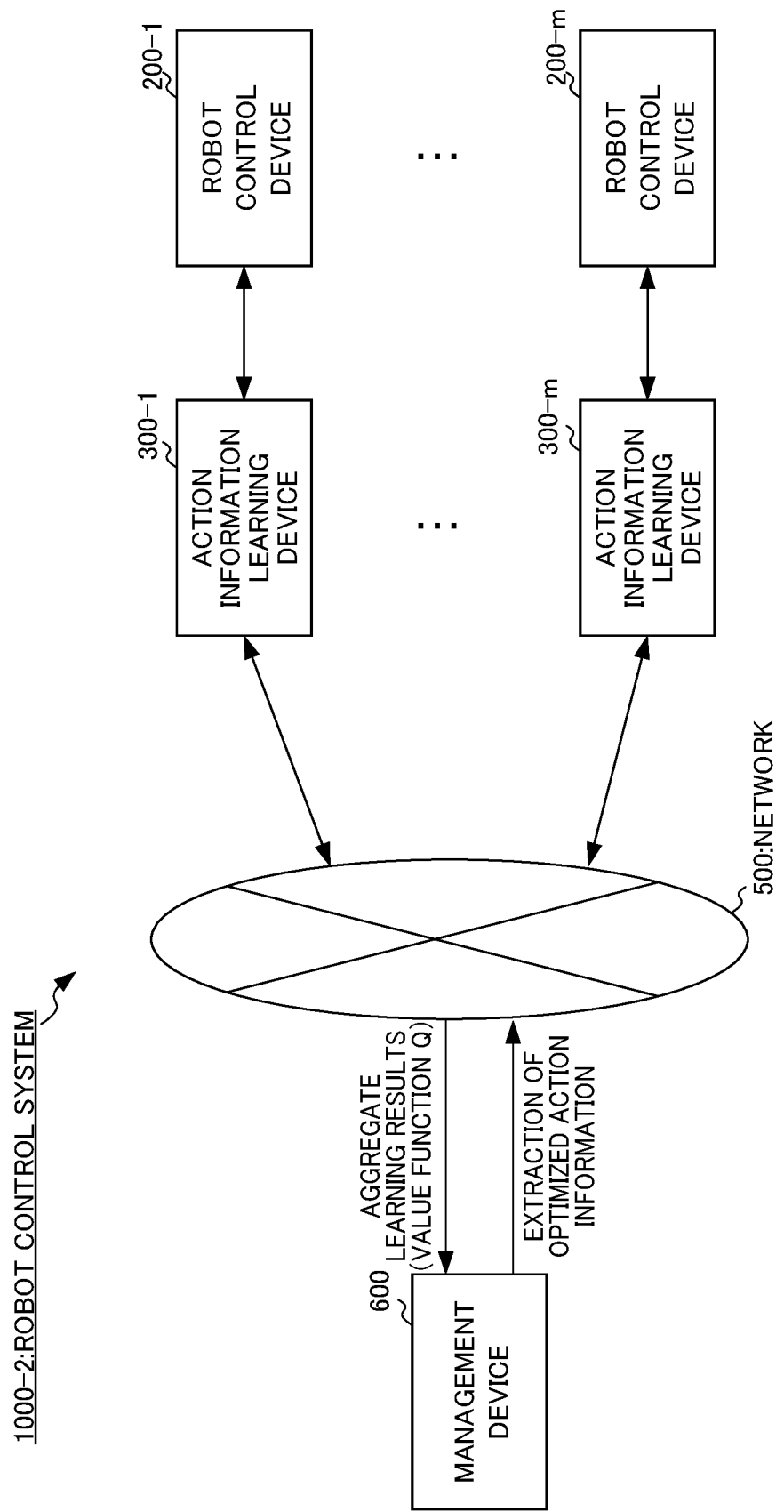
FIG. 6 is a block diagram showing cooperation between action information learning devices in a modified embodiment of the present invention.

In the aforementioned embodiment, a configuration is explained in which the action information learning device 300 performs reinforcement learning. In this regard, a configuration may be established in which a robot control system 1000-2 includes a management device 600 connected via a network 500 to m-number of action information learning devices 300, as shown in FIG. 6. For example, in the case of equipping the action information learning device 300 to each of the robot control devices 200, m is the number of robot control devices 200. Then, in the case of the relative work environments of the robot 100 and operator P satisfying the same conditions (for example, matter of the position of the robot 100, handover area 8, movable area of hand unit 13 of robot 100, etc. being relatively the same), by connecting the management device 600 via the network 500 to the plurality of action information learning devices 300-1 to 300-$m$, the management device 600 can aggregate the value functions Q of the respective action information learning devices 300. By configuring in this way, the value functions Q are shared between all of the action information learning devices 300. So long as configured so as to share the value functions Q between a plurality of the action information learning devices 300, it will be possible to perform reinforcement learning by distributing over the respective action information learning devices 300; therefore, it becomes possible to improve the efficiency of reinforcement learning.

Then, it may be configured so that the management device 600 sends the aggregated value functions Q to the respective action information learning devices 300. It should be noted that it may be configured so that the management device 600 collects the data for learning from the respective action information learning devices 300, and updates the value functions Q. In addition, it may be configured so that the management device 600 outputs the optimized action information to the respective robot control devices 200.

EXPLANATION OF REFERENCE NUMERALS 7 workpiece
8 handover area
13 hand unit
100 robot
110 motor unit
120 release button
200 robot control device
210 motor control unit
220 parameter setting unit
300 action information learning device
310 state information acquisition unit
320 action information output unit
330 learning unit
331 reward calculation section
332 value function update section
333 action information generation section
340 value function storage unit
350 optimized action information output unit
400, 500 network
1000 robot control system
P operator
T handover time
T1 movement time
T2 release time

What is claimed is:

1. An action information learning device comprising:
a state information acquisition unit for acquiring state information of a robot, in a case of the robot handing over a workpiece acquired from a workpiece storage place to an operator within a workpiece handover area, which is an area in which to hand over the workpiece, the state information including first state information related to a handover of a first workpiece and second state information related to a handover of a second workpiece;
an action information output unit for outputting action information, which is adjustment information for the first state information;
a reward calculation unit for defining a first handover time related to the handover of the first workpiece as first determination information, defining a second handover time related to the handover of the second workpiece as second determination information, and calculating a value of reward in reinforcement learning based on the second determination information; and
a value function update unit for updating a value function by way of performing the reinforcement learning based on the value of reward calculated by the reward calculation unit, the second state information and the action information,
wherein the reward calculation unit, in a case of setting the first handover time related to the first state information as a previous handover time, and setting the second handover time related to the second state information after compensation by compensating the first state information based on the action information, as a current handover time,
sets a value of the reward as a positive value in a case of the current handover time, which is the second determination information, being shorter than the previous handover time, and
sets a value of the reward as a negative value in a case of the current handover time, which is the second determination information, being longer than the previous handover time.

2. The action information learning device according to claim 1,
wherein the first state information and the second state information include information related to a posture of the robot and handover position within the workpiece handover area, and
wherein the adjustment information includes information for performing adjustment of the first state information.

3. The action information learning device according to claim 2,
wherein the first state information further includes a movement path of the robot from a position at which the first workpiece is acquired to a position within the workpiece handover area, and
wherein the second state information further includes a movement path of the robot from a position at which the second workpiece is acquired to a position within the workpiece handover area.

4. The action information learning device according to claim 1,
wherein the current handover time includes a movement time from acquiring the second workpiece until moving to a position within the workpiece handover area, and a release time until the operator receives the second workpiece after moving the second workpiece to the position within the workpiece handover area, and
wherein, when the current handover time is shorter than the previous handover time, the value of reward is set to a larger value for a case of the release time becoming shorter than a case of the movement time becoming shorter.

5. A robot control system comprising:
the action information learning device according to claim 1; and
a robot control device that is connected to the action information learning device via a communication network, and controls the robot,
wherein the action information learning device comprises:
an optimized action information output unit for generating optimized action information, which is action information for minimizing the second handover time by the robot, based on the value function updated by the value function update unit;
the optimized action information output unit for outputting the optimized action information generated to the robot control device.

6. A management device which is communicably connected to a plurality of action information learning devices which include the action information learning device according to claim 1,
- wherein the management device shares the value function with the plurality of action information learning devices, and
- updates the value function thus shared.

7. An action information learning method comprising the steps of:
- acquiring state information of a robot by way of a state information acquisition unit, in a case of the robot handing over a workpiece acquired from a workpiece storage place to an operator, within a workpiece handover area, which is an area in which to hand over the workpiece, the state information including first state information related to a handover of a first workpiece and second state information related to a handover of a second workpiece;
- outputting action information, which is adjustment information for the first state information, by way of an action information output unit;
- setting a first handover time related to the handover of the first workpiece as first determination information, setting a second handover time related to the handover of the second workpiece as second determination information, and calculating a value of reward in reinforcement learning based on the second determination information, by way of a reward calculation unit;
- updating, by way of a value function update unit, a value function by performing the reinforcement learning based on the value of reward thus calculated, the second state information, and the action information; and
- in a case of setting the first handover time related to the first state information as a previous handover time, and setting the second handover time related to the second state information after compensation by compensating the first state information based on the action information as a current handover time,
- the reward calculation unit setting a value of the reward as a positive value in a case of the current handover time, which is the second determination information, being shorter than the previous handover time, and
- the reward calculation unit setting the value of the reward as a negative value in a case of the current handover time, which is the second determination information, being longer than the previous handover time.

8. The action information learning method according to claim 7,
- wherein the current handover time includes a movement time from acquiring the second workpiece until moving to a position within the workpiece handover area, and a release time until the operator receives the second workpiece after moving the second workpiece to the position within the workpiece handover area, and
- wherein, when the current handover time is shorter than the previous handover time, the value of reward is set to a larger value for a case of the release time becoming shorter than a case of the movement time becoming shorter.

* * * * *